United States Patent
Takiguchi

(10) Patent No.: US 11,036,336 B2
(45) Date of Patent: Jun. 15, 2021

(54) DISPLAY INPUT DEVICE AND IMAGE FORMING APPARATUS

(71) Applicant: KYOCERA Document Solutions Inc., Osaka (JP)

(72) Inventor: Fumiaki Takiguchi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/881,204

(22) Filed: May 22, 2020

(65) Prior Publication Data

US 2020/0379601 A1   Dec. 3, 2020

(30) Foreign Application Priority Data

May 27, 2019   (JP) .............. JP2019-098322

(51) Int. Cl.
*G06F 3/041* (2006.01)
*G06T 7/70* (2017.01)

(52) U.S. Cl.
CPC .............. *G06F 3/0418* (2013.01); *G06T 7/70* (2017.01)

(58) Field of Classification Search
CPC ................................ G06F 3/0418; G06T 7/70
USPC .................................................. 345/170–178
See application file for complete search history.

(56) References Cited

U.S. PATENT DOCUMENTS

| | | | |
|---|---|---|---|
| 8,823,399 B1 | 9/2014 | Bharathan | G01R 27/2605 |
| 9,715,307 B1* | 7/2017 | Barsness | G06F 3/0418 |
| 9,746,507 B1 | 8/2017 | Bharathan | G01R 27/2605 |
| 9,870,098 B1* | 1/2018 | Barsness | G06F 3/0418 |
| 2017/0075489 A1* | 3/2017 | Jaaskela | G06F 3/0418 |
| 2018/0003752 A1 | 1/2018 | Bharathan | G01R 27/2605 |
| 2018/0121081 A1* | 5/2018 | Barsness | G06F 3/0418 |
| 2018/0164359 A1 | 6/2018 | Bharathan | G01R 27/2605 |
| 2018/0260093 A1* | 9/2018 | Barsness | G06F 3/0488 |
| 2019/0204979 A1* | 7/2019 | La | G06F 3/0414 |
| 2020/0379601 A1* | 12/2020 | Takiguchi | G06T 7/70 |
| 2020/0408630 A1* | 12/2020 | Zhao | H04N 7/18 |

FOREIGN PATENT DOCUMENTS

JP   2018-139436 A   9/2018

* cited by examiner

*Primary Examiner* — Tony O Davis
(74) *Attorney, Agent, or Firm* — Stein IP, LLC

(57) ABSTRACT

A display input device has a touch screen, which includes a touch panel for accepting a touch operation, and a control portion. The control portion detects contact position on the touch panel with a contact body, contact size on the touch panel with the contact body, and contact pressure on the touch panel with the contact body, judges whether calibration is necessary based on the contact position, contact size, and contact pressure, and performs calibration when it is judged that calibration is necessary.

8 Claims, 4 Drawing Sheets

DISPLAY INPUT DEVICE AND IMAGE FORMING APPARATUS

INCORPORATION BY REFERENCE

This application is based upon and claims the benefit of priority from the corresponding Japanese Patent Application No. 2019-098322 filed on May 27, 2019, the entire contents of which are incorporated herein by reference.

BACKGROUND

The present disclosure relates to a display input device provided with a touch screen, and to an image forming apparatus.

An image forming apparatus is provided with a display input device. The display input device accepts operations from a user. Some display input devices are provided with a touch screen. The touch screen includes a touch panel. A user, when performing an operation on the touch screen, brings a contact body into contact with the touch panel.

In conventional display input devices, the touch panel is calibrated. In calibration of the touch panel, for example, the baseline is corrected. Calibration of the touch panel is performed when the display input device is started up. When the display input device is started up, calibration of the touch panel is performed periodically.

SUMMARY

According to a first aspect of what is disclosed herein, a display input device is provided with a touch screen and a control portion. The touch screen includes a touch panel for accepting a touch operation. The control portion detects the contact position on the touch panel with a contact body, the contact size on the touch panel with the contact body, and the contact pressure on the touch panel with the contact body; judges whether calibration of the touch panel is necessary based on the contact position, the contact size, and the contact pressure; and performs calibration when it is judged that calibration is necessary.

According to a second aspect of what is disclosed herein, an image forming apparatus includes a display input device as described above.

DETAILED DESCRIPTION

First Embodiment

Figure 1:
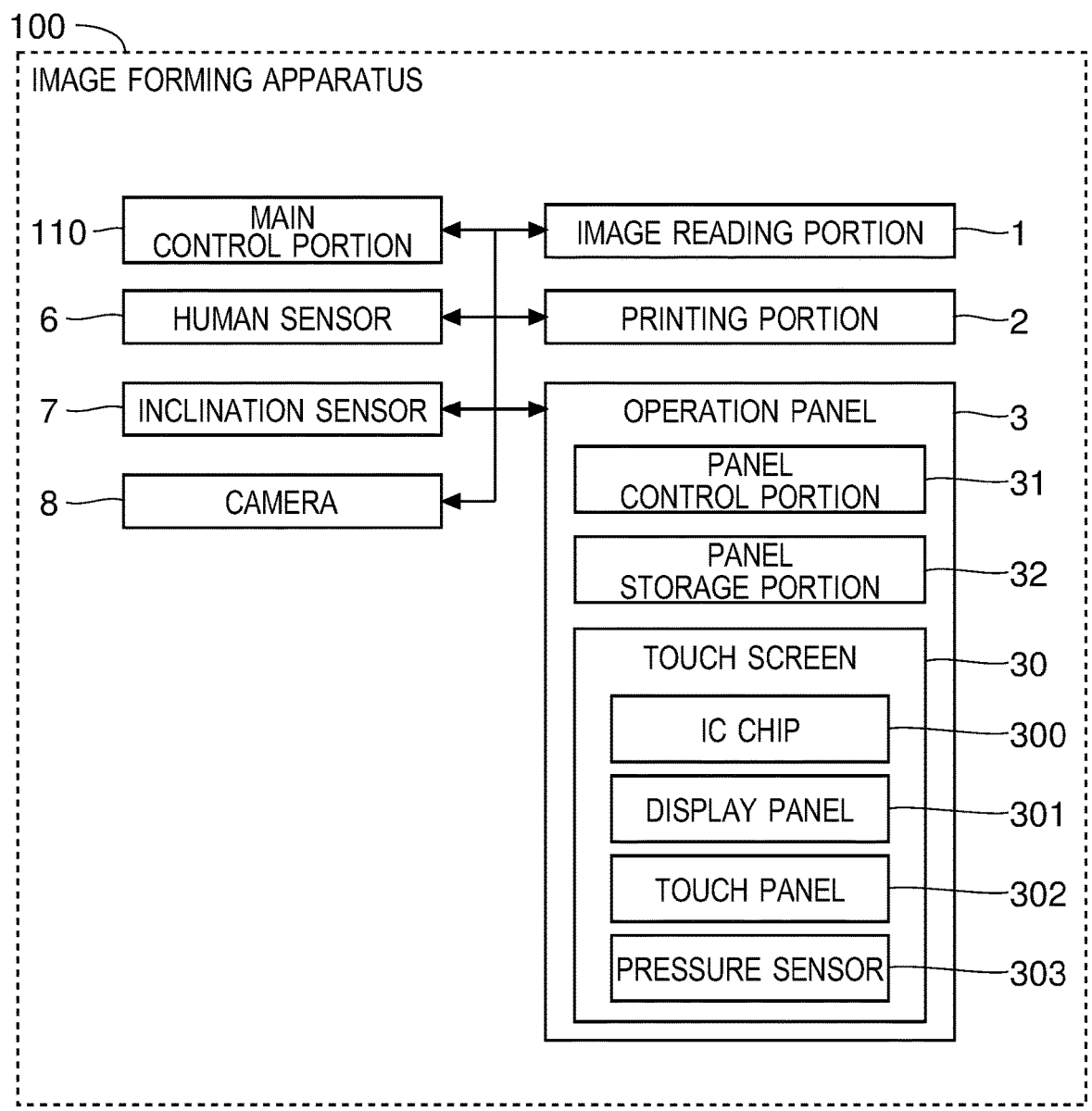
FIG. 1 is a diagram showing a structure of an image forming apparatus provided with an operation panel according to a first embodiment.

As shown in FIG. 1, an image forming apparatus 100 according to a first embodiment is provided with an image reading portion 1 and a printing portion 2. The image reading portion 1 reads a document and generates image data of the document. The printing portion 2 prints on paper an image based on image data (for example, image data of a document obtained through document reading by the image reading portion 1).

Figure 2:
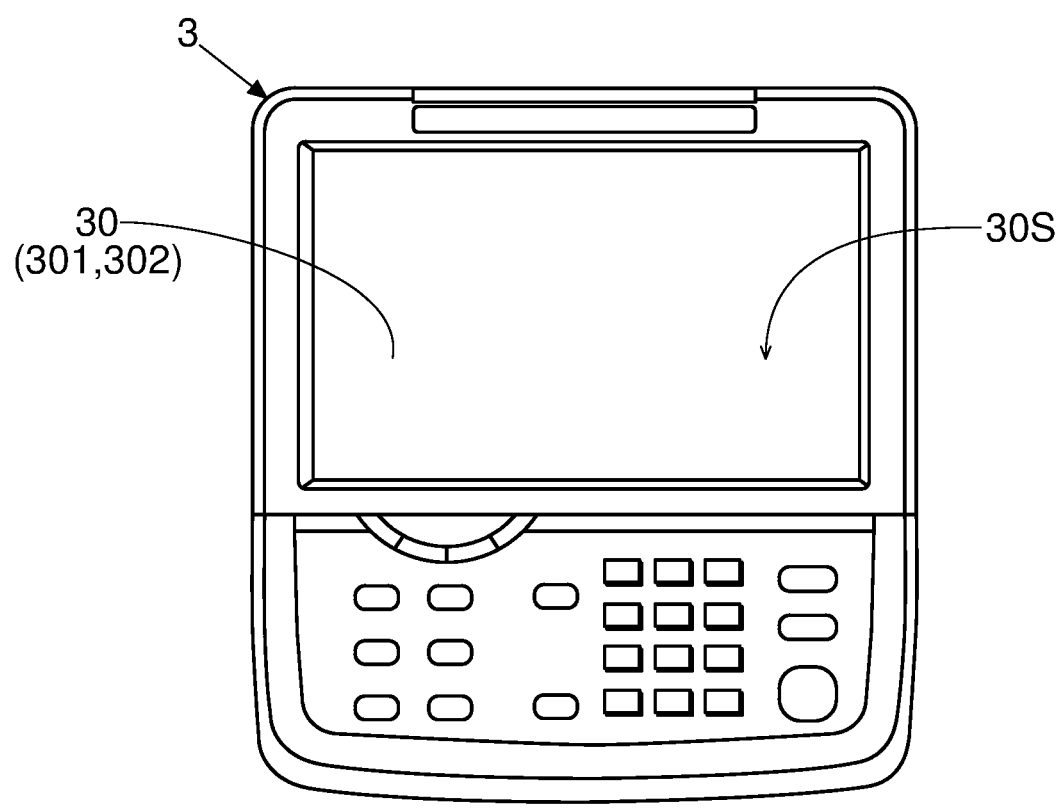
FIG. 2 is a diagram showing a structure of the operation panel according to the first embodiment.

The image forming apparatus 100 includes an operation panel 3 as shown in FIG. 2. The operation panel 3 corresponds to a "display input device".

The operation panel 3 is provided with a touch screen 30. The touch screen 30 has an operation face 30S for accepting touch operations. A user, when performing an operation on the touch screen 30, brings a contact body into contact with the operation face 30S. For example, a user's finger can be a contact body.

The touch screen 30 is provided with a display panel 301 and a touch panel 302. The display panel 301 may be a liquid crystal display panel or an organic EL display panel. The touch panel 302 is a touch panel of a capacitive type. The touch panel 302 is arranged on the surface of the display panel 301. The surface of the touch panel 302 (the face opposite from the display panel 301 side) is the operation face 30S. When a user brings a contact body into contact with the operation face 30S, the electrostatic capacitance of the touch panel 302 at a position at which the contact body has made contact with it changes.

The operation panel 3 is supported so as to be pivotable about a pivot shaft provided on the main body of the image forming apparatus 100. By pivoting the operation panel 3, it is possible to change the inclination of the operation face 30S with respect to the horizontal direction.

Back in FIG. 1, the image forming apparatus 100 is provided with a main control portion 110. The main control portion 110 controls the entire image forming apparatus 100. The main control portion 110 controls the reading operation by the image reading portion 1 as well as the printing operation by the printing portion 2.

The operation panel 3 is provided with a panel control portion 31 and a panel storage portion 32. The panel control portion 31 corresponds to a "control portion". The panel storage portion 32 corresponds to a "storage portion". The panel control portion 31 includes a CPU. The panel storage portion 32 includes a ROM and a RAM. The panel control portion 31 reads information from the panel storage portion 32 and writes information to the panel storage portion 32.

The panel control portion 31, upon receiving an instruction from the main control portion 110, controls the display operation by the display panel 301. Display data for the screen displayed on the display panel 301 is stored in the panel storage portion 32. The panel control portion 31, based on the output signal from the touch screen 30, detects the presence or absence of a touch operation on the touch panel 302 (whether a contact body is in contact with the touch panel 302). The panel control portion 31 notifies the main control portion 110 what touch operations have been performed on the touch panel 302.

The touch screen 30 is provided with an IC chip 300. The IC chip 300 detects, at a prescribed cycle, the contact position (coordinate values in the X-axis and Y-axis directions) on the touch panel 302 with the contact body. In other words, the IC chip 300 detects, at a prescribed cycle, the operation position of the touch operation on the touch panel 302. The IC chip 300 outputs a contact position signal indicating the detected contact position (operation position) to the panel control portion 31. A signal indicating a position at which the difference between the electrostatic capacitance and the baseline (the difference will hereinafter be referred to as the electrostatic capacitance level) has become equal to or larger than a prescribed threshold value is output as a contact position signal from the IC chip 300 to the panel control portion 31. The panel control portion 31, based on the contact position signal, detects the presence or absence of contact with the contact body on the touch panel 302. The panel control portion 31, based on the contact position signal, detects the contact position on the touch panel 302 with the contact body.

The IC chip 300 detects, at a prescribed cycle, also the contact size (the size of the area over which the contact body is making contact with the touch panel 302) on the touch panel 302 with the contact body. When a user brings a finger into contact with the touch panel 302, the finger size of the user is detected. The IC chip 300 outputs a contact size signal indicating the detected contact size to the panel control portion 31. For example, the dimensions (lengths) in the X-axis and Y-axis directions of the area centered around the contact position are detected as a contact size. By making the IC chip 300 perform a predetermined program, it is possible to make the IC chip 300 detect the contact size on the touch panel 302 with the contact body. The panel control portion 31, based on the contact size signal, detects the contact size on the touch panel 302 with the contact body.

The touch screen 30 is provided with a pressure sensor 303. There is no particular limitation on the type of the pressure sensor 303. The pressure sensor 303 is, for example, of a capacitive type. The IC chip 300 detects, at a prescribed cycle, a contact pressure (pressing force) on the touch panel 302 with the contact body based on the output value of the pressure sensor 303. The IC chip 300 outputs to the panel control portion 31 a contact pressure signal indicating the detected contact pressure. The panel control portion 31, based on the contact size signal, detects the contact pressure on the touch panel 302 with the contact body.

Here, to the panel control portion 31, a human sensor 6 is connected. The human sensor 6 is a sensor for detecting the presence of a human around the image forming apparatus 100 (within the detection range of the human sensor 6). The human sensor 6 is provided, for example, in the operation panel 3. The human sensor 6 may be provided in the main body of the image forming apparatus 100.

The human sensor 6, when no human is within the detection range of the human sensor 6, outputs a value indicating no presence of a human. On the other hand, the human sensor 6, when a human is within the detection range of the human sensor 6, outputs a value indicating presence of a human. There is no particular limitation on the type of the human sensor 6. For example, an ultrasonic sensor may be used as the human sensor 6. An infrared sensor may be used as the human sensor 6.

The panel control portion 31 monitors the output value of the human sensor 6. The panel control portion 31, when a value indicating presence of a human is output from the human sensor 6, detects that there is a human around the image forming apparatus 100. On the other hand, the panel control portion 31, when a value indicating no presence of a human is output from the human sensor 6, detects that there is no human around the image forming apparatus 100.

To the panel control portion 31, also an inclination sensor 7 is connected. The inclination sensor 7 is a sensor for sensing the inclination angle of the operation face 30S with respect to the horizontal direction. The inclination sensor 7 includes an optical sensor and is provided in the main body of the image forming apparatus 100.

The inclination sensor 7 changes its output value as the operation panel 3 pivots. That is, the inclination sensor 7 outputs a value in accordance with the inclination angle of the operation face 30S with respect to the horizontal direction. For example, an actuator that moves together with the pivoting of the operation panel 3 may be provided on the operation panel 3 to make the actuator the target of sensing by the inclination sensor 7.

To the panel control portion 31, a camera 8 is connected. Captured data obtained through capturing by the camera 8 is fed to the panel control portion 31. The camera 8 is provided at a position at which it can capture the face of a user operating the operation panel 3. For example, the camera 8 is provided on the operation panel 3. This makes it possible to capture the face of a user operating the operation panel 3 with the camera 8. In the first embodiment, the camera 8 may be omitted.

Here, the panel control portion 31 performs calibration of the touch panel 302. In calibration of the touch panel 302, correction of the baseline is performed. The baseline indicates the electrostatic capacitance value in a state where the touch panel 302 is not in contact with the contact body (a state where no touch operation is performed on the touch panel 302). The baseline is stored in the panel storage portion 32. The panel control portion 31, when performing calibration of the touch panel 302, detects the electrostatic capacitance value in a state where the contact body is not in contact with the touch panel 302. The panel control portion 31, based on the detected electrostatic capacitance value, corrects the existing baseline stored in the panel storage portion 32.

The panel control portion 31 starts up when the main power to the image forming apparatus 100 is turned on. The panel control portion 31, upon starting up, performs calibration of the touch panel 302. The panel control portion 31 also performs calibration of the touch panel 302 periodically. The operation panel 3 may accept an instruction to execute calibration from a user. The panel control portion 31, when the operation panel 3 accepts an instruction to execute calibration, performs calibration of the touch panel 302.

Here, the baseline may be incorrect. If the baseline is incorrect, even when the touch operation is performed on the touch panel 302, inconveniently, the touch operation may not be detected. Or, even though no touch operation is performed on the touch panel 302, a touch operation may be detected. Such inconveniences arise when calibration is performed in a state where, for example, the contact body is in contact with the touch panel 302. When the baseline is incorrect, calibration of the touch panel 302 is necessary.

Thus, the panel control portion 31 performs calibration judging processing (processing for judging whether calibration of the touch panel 302 is necessary or not). When the panel control portion 31 judges that calibration is necessary, calibration of the touch panel 302 is performed automatically. When the panel control portion 31 judges that calibration is necessary, a user may be notified that calibration of the touch panel 302 is necessary. The notification that calibration is necessary is given by the operation panel 3. The operation panel 3 displays a message conveying that calibration is necessary.

Figure 3:
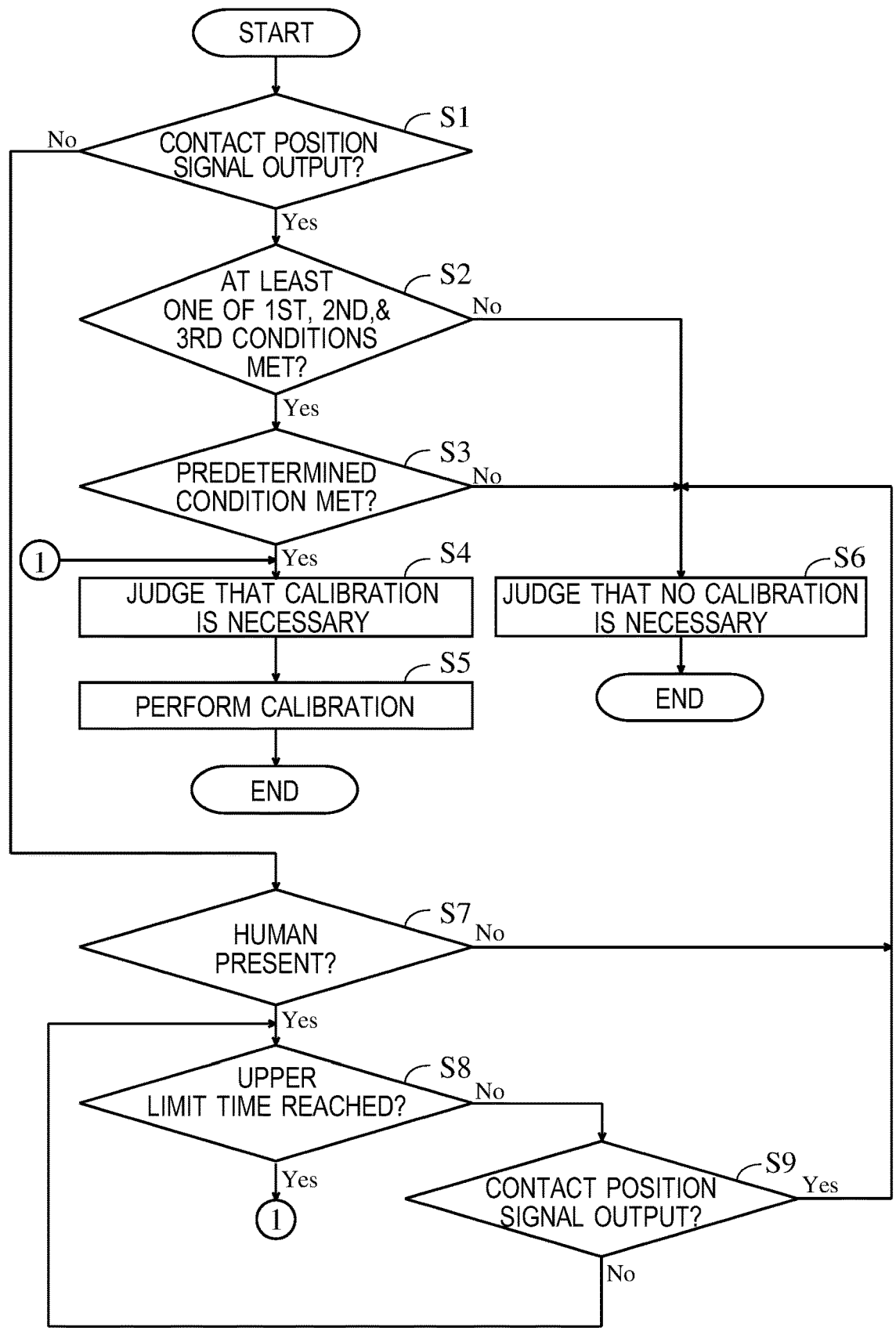
FIG. 3 is a flow chart showing the flow of calibration judging processing in the first embodiment.

The flow of calibration judging processing in the first embodiment will be described below with reference to a flow chart shown in FIG. 3. For example, the panel control portion 31 starts calibration judging processing every predetermined period.

In step S1, the panel control portion 31 judges whether a contact position signal is output from the touch screen 30. When the panel control portion 31 judges that a contact position signal is output from the touch screen 30, the process proceeds to step S2.

When the baseline is not incorrect, no contact position signal is output from the touch screen 30 unless a user brings a contact body into contact with the touch panel 302. When a user brings a contact body into contact with the touch panel 302, a contact position signal is output from the touch screen 30. However, when the baseline is incorrect, even when a user does not bring the contact body into contact with the touch panel 302, a contact position signal may be output from the touch screen 30. Or, even when a user brings the contact body into contact with the touch panel 302, no contact position signal may be output from the touch screen 30.

In step S2, the panel control portion 31, based on the contact position signal, detects variation in the contact position. The panel control portion 31, based on a contact size signal, detects variation in the contact size. The panel control portion 31, based on a contact pressure signal, detects variation in the contact pressure. Then, the panel control portion 31 judges whether at least one of the following conditions is met: a first condition where the variation in the detected contact position is within a prescribed first variation range throughout a predetermined time period; a second condition where the variation in the detected contact size is within a prescribed second variation range throughout the predetermined time period; and a third condition where the variation in the detected contact pressure is within a prescribed third variation range throughout the predetermined time period.

The predetermined time period is stored in the panel storage portion 32 in advance. For example, the predetermined time is 30 seconds. A user can freely set (change) the predetermined time. The operation panel 3 displays an unillustrated setting screen and accepts from a user an operation for setting the predetermined time. Also the first, second, and third variation ranges are stored in the panel storage portion 32 in advance.

The panel control portion 31, when judging whether the first condition is met or not, sets the contact position (coordinate values in the X-axis and Y-axis directions) detected when calibration judging processing was started (last time) as a reference position and continues to detect the contact position until a predetermined time passes. Every time the contact position is detected, the panel control portion 31 calculates, for each of the coordinate values in the X-axis and Y-axis directions, the difference between the detected contact position and the reference position as the variation in the contact position. In a case where, for example, the first variation range is within ±3 dots, the panel control portion 31 judges that the first condition is met when the calculated differences (variation in the contact position) all fall within the range of ±3 dots.

Likewise, the panel control portion 31, when judging whether the second condition is met or not, sets the contact size (sizes in the X-axis and Y-axis directions) detected when calibration judging processing was started (last time) as a reference size and continues to detect the contact size until a predetermined time passes. Every time the contact size is detected, the panel control portion 31, for each of the sizes in the X-axis and Y-axis directions, calculates the difference between the detected contact size and the reference size as the variation in the contact size. In a case where, for example, the second variation range is within ±1 mm, the panel control portion 31 judges that the second condition is met when the calculated differences (variation in the contact size) all fall within the range of ±1 mm.

Likewise, the panel control portion 31, when judging whether the third condition is met or not, sets the contact pressure detected when calibration judging processing was started (last time) as a reference pressure and continues to detect the contact pressure until a predetermined time passes. Every time the contact pressure is detected, the panel control portion 31 calculates the ratio of the difference between the detected contact pressure and the reference pressure to the reference pressure as the variation in the contact pressure. In a case where, for example, the third variation range is within ±10%, the panel control portion 31 judges that the third condition is met when the calculated ratios (variation in the contact pressure) all fall within the range of ±10%.

Here, typically, when a user brings a contact body into contact with the touch panel 302 with an intention to perform a touch operation, after bringing the contact body into contact with the touch panel 302, the user removes the contact body from the touch panel 302 before a predetermined time passes. Even if a user performs a long-press operation in which a contact body is kept in contact with the touch panel 302, it rarely occurs that the time from the start of the long-press operation until its completion reaches a predetermined time. Thus, when at least one of the first, second, and third conditions is met, there is a high probability that a signal indicating that a contact body is in contact with the touch panel 302 (that is, a contact position signal) is output from the touch screen 30 even though a user is not performing a touch operation on the touch panel 302 (there is a high probability that the baseline is incorrect).

A user may, after bringing a contact body into contact with the touch panel 302, keep the contact body in contact with the touch panel 302 until a predetermined time passes; even in such a case, it is usually difficult to keep the contact body in contact with the touch panel 302 without any displacement until a predetermined time passes. That is, the contact body is displaced before a predetermined times passes.

When the contact body is displaced, the variation in the contact position detected by the panel control portion 31 falls outside the first variation range. Thus, when the first condition is not met (when the variation in the contact position falls outside the first variation range), there is a high probability that the user is keeping the contact body in contact with the touch panel 302 with an intention to perform a touch operation. On the other hand, when the first condition is met (when the variation in the contact position falls within the first variation range), there is a high probability that, even though a user is not performing a touch operation on the touch panel 302, a signal indicating that a contact body is in contact with the touch panel 302 is output from the touch screen 30.

When the contact body is displaced, the contact size detected by the panel control portion 31 changes. That is, the contact size detected by the panel control portion 31 becomes larger or smaller. As a result, the variation in the contact size detected by the panel control portion 31 falls outside the second variation range. Thus, when the second condition is not met (when the variation in the contact size falls outside the second variation range), there is a high probability that a user is keeping the contact body in contact with the touch panel 302 with an intention to perform a touch operation. On the other hand, when the second condition is met (when the variation in the contact size falls within the second variation range), there is a high probability that, even though a user is not performing a touch operation on the touch panel 302, a signal indicating that a contact body is in contact with the touch panel 302 is output from the touch panel 302.

When the contact body is displaced, the contact pressure detected by the panel control portion 31 changes. That is, the contact pressure detected by the panel control portion 31 becomes higher or lower. As a result, the variation in the contact pressure detected by the panel control portion 31 falls outside the third variation range. Thus, when the third condition is not met (when the variation in the contact pressure falls outside the third variation range), there is a high probability that a user is keeping the contact body in contact with the touch panel 302 with an intention to perform a touch operation. On the other hand, when the third condition is met (when the variation in the contact pressure falls within the third variation range), there is a high probability that, even though a user is not performing a touch operation on the touch panel 302, a signal indicating that a contact body is in contact with the touch panel 302 is output.

Thus, it is preferable to perform calibration of the touch panel 302 when at least one of the first, second, and third conditions is met. However, some users who are keeping a contact body in contact with the touch panel 302 happen to be able to keep the contact body without any displacement. That is, even when at least one of the first, second, and third conditions is met, there is a probability that a user is keeping a contact body in contact with the touch panel 302 with an intention to perform a touch operation (the baseline is not necessarily incorrect).

To cope with that, when the panel control portion 31 judges that at least one of the first, second, and third conditions is met in step S2, the process proceeds to step S3. A configuration is also possible where the process proceeds to step S3 when the panel control portion 31 judges that two of the first, second, and third conditions are met. Or, a configuration is also possible where the process proceeds to step S3 when the panel control portion 31 judges that all of the first, second, and third conditions are met.

In step S3, the panel control portion 31 judges whether a predetermined condition is met. The predetermined condition will be described later.

In step S3, when it is judged that the predetermined condition is met, the panel control portion 31 judges that there is a high probability that, even though a user is not performing a touch operation on the touch panel 302, a signal indicating that a contact body is in contact with the touch panel 302 is output from the touch panel 302. In this case, in step S4, the panel control portion 31 judges that calibration is necessary. Then, in step S5, the panel control portion 31 automatically performs calibration (correction of the baseline) of the touch panel 302.

In step S3, when it is judged that the predetermined condition is not met, the panel control portion 31 judges that there is a high probability that a user is keeping a contact body in contact with the touch panel 302 with an intention to perform a touch operation. In this case, in step S6, the panel control portion 31 judges that calibration is not necessary.

The predetermined condition will now be described.

When performing calibration judging processing, the panel control portion 31, based on the output value of the human sensor 6, judges whether there is a human around the image forming apparatus 100 (within the detection range of the human sensor 6). The human sensor 6 is arranged at such a position that a user performing a touch operation on the touch panel 302 is within the detection range of the human sensor 6. Thus, when the panel control portion 31 detects that there is no human, there is a high probability that a user is not performing a touch operation on the touch panel 302.

On the other hand, when the panel control portion 31 detects that there is a human, there is a high probability that a user is performing a touch operation on the touch panel 302.

Thus, when detecting that there is no human based on the output value of the human sensor 6, the panel control portion 31 judges that the predetermined condition is met. On the other hand, when detecting that there is a human based on the output value of the human sensor 6, the panel control portion 31 judges that a predetermined condition is not met.

The panel control portion 31, when performing calibration judging processing, recognizes the display area of an operation acceptance image arranged on the screen currently being displayed on the touch screen 30. An operation acceptance image corresponds to, for example, the image of a software button. In the following description, the screen with an operation acceptance image arranged on it is referred to as an acceptance screen.

When a touch operation is performed on the acceptance screen, a user brings a contact body into contact with the display area of the operation acceptance image. Usually, a user does not bring a contact body into contact with outside the display area of the operation acceptance image.

Thus, when a position outside the display area of the operation acceptance image is detected as a contact position, the panel control portion 31 judges that the predetermined condition is met. On the other hand, when a position within the display area of the operation acceptance image is detected as a contact position, the panel control portion 31 judges that the predetermined condition is not met.

For example, when the panel control portion 31 detects that no human is present based on the output value of the human sensor 6 and when the panel control portion 31 detects a position outside the display area of the operation acceptance image as a contact position, it is judged that the predetermined condition is met. That is, when the panel control portion 31 detects a position in the display area of the operation acceptance image as a contact position, it is judged that the predetermined condition is not met. Also when the panel control portion 31 detects that a human is present based on the output value of the human sensor 6, it is judged that a predetermined condition is not met.

A configuration is also possible where, when the panel control portion 31 detects a position outside the display area of the operation acceptance image as a contact position, even if the panel control portion 31 detects the presence of a human, the panel control portion 31 judges that the predetermined condition is met. A configuration is also possible where, when the panel control portion 31 detects no presence of a human, even if the panel control portion 31 detects that a position in the display area of the operation acceptance image is the contact position, the panel control portion 31 judges that the predetermined condition is met.

In step S2, when the panel control portion 31 judges that none of the first, second, and the third conditions are met, the process proceeds to step S6. In other words, when there is a high probability that a user keeps a contact body in contact with the touch panel 302 with an intention to perform a touch operation, the process proceeds to step S6.

The processing in step S3 may be omitted. In this case, when the panel control portion 31 judges that at least one of the first, second, and third conditions is met in step S2, the process proceeds to step S4.

In step S1, when the panel control portion 31 judges that no contact position signal is output from the touch screen 30, the process proceeds to step S7. In step S7, the panel control portion 31, based on the output value of the human sensor 6, judges whether there is a human around the image forming apparatus 100 (within the detection range of the human sensor 6). When the panel control portion 31 judges that there is a human, the process proceeds to step S8.

In step S8, the panel control portion 31 recognizes a no-detection time, which is the time that has passed, while the presence of a human is detected, with no detection of contact with a contact body on the touch panel 302 (with no output of a contact position signal from the touch screen 30). The panel control portion 31 judges whether the no-detection time has reached a prescribed upper limit time. The upper limit time has, for example, the same length as the predetermined time (30 seconds) that is used for judging whether the first, second, and third conditions are met. The upper limit time may have a different length from the predetermined time. When the panel control portion 31 judges that the no-detection time has reached the upper limit time, the process proceeds to step S4.

Here, when a user is performing a touch operation on the touch panel 302, the panel control portion 31 detects that there is a human. Thus, when, even though the panel control portion 31 detects the presence of a human, no contact position signal is output from the touch screen 30 for a long time, there is a high probability that the baseline is incorrect. Thus, when the no-detection time reaches the upper limit time, the process proceeds from step S8 to step S4.

In step S8, when the panel control portion 31 judges that the no-detection time has not reached the upper limit time, the process proceeds to step S9. In step S9, the panel control portion 31 judges whether a contact position signal is output from the touch screen 30. When the panel control portion 31 judges that a contact position signal is output from the touch screen 30, the process proceeds to step S6. When the panel control portion 31 judges that no contact position signal is output from the touch screen 30, the process proceeds to step S8.

In step S7, when the panel control portion 31 judges that there is no human, the process proceeds to step S6. When there is no human, usually, no operation position signal is output from the touch screen 30. That is, when, with no presence of a human, no operation position signal is output from the touch screen 30, it means that the baseline is not incorrect.

A configuration is also possible where, in step S3, the panel control portion 31 judges that the predetermined condition is met when at least one of the following conditions is met: a condition where the variation in the contact position detected by the panel control portion 31 falls outside a first allowable range; a condition where the contact size detected by the panel control portion 31 falls outside a second allowable range; and a condition where the contact pressure detected by the panel control portion 31 falls outside a third allowable range.

In this configuration, the panel control portion 31, when performing calibration judging processing, sets the first, second, and third allowable ranges.

For example, a reference range of the first allowable range (hereinafter, referred to as a first reference range) is prescribed and is stored in the panel storage portion 32. The variation in the contact position when a user is performing a touch operation on the touch panel 302 is calculated experimentally or empirically, and the first reference range is determined based on the variation in the contact position.

A reference range of the second allowable range (hereinafter, referred to as a second reference range) is prescribed and is stored in the panel storage portion 32. The contact size when a user is performing a touch operation on the touch panel 302 is calculated experimentally or empirically, and the second reference range is determined based on the contact size.

A reference range of the third allowable range (hereinafter, referred to as a third reference range) is prescribed and is stored in the panel storage portion 32. The contact pressure when a user is performing a touch operation on the touch panel 302 is calculated experimentally or empirically, and the third reference range is determined based on the contact pressure.

The panel control portion 31, when starting calibration judging processing, based on the output value of the inclination sensor 7, detects the inclination angle of the operation face 30S with respect to the horizontal direction. The panel control portion 31, based on the inclination angle of the operation face 30S with respect to the horizontal direction, sets the third allowable range.

Here, the closer to horizontal the inclination of the operation face 30S, the stronger the pressing force when a user brings a contact body into contact with the touch panel 302. Thus, the closer to horizontal the inclination of the operation face 30S, the higher the panel control portion 31 makes the median of the third allowable range. In other words, the closer to horizontal the inclination of the operation face 30S, the further the panel control portion 31 makes the median of the third allowable range higher than the median of the third reference range.

For example, the panel control portion 31 compares the inclination angle of the operation face 30S with a prescribed threshold angle. The threshold angle is stored in the panel storage portion 32. The threshold angle is, for example, between 30° and 60° (for example, 45°). Then, when the inclination angle of the operation face 30S is smaller than the threshold angle (when the inclination of the operation face 30S is rather close to horizontal), the panel control portion 31 makes the median of the third allowable range larger than the median of the third reference range by the predetermined value. On the other hand, when the inclination angle of the operation face 30S is equal to or larger than the threshold angle, the panel control portion 31 sets the third reference range as the third allowable range.

Also the first and second allowable ranges may be set based on the inclination of the operation face 30S with respect to the horizontal direction.

For example, suppose that the inclination of the operation face 30S is substantially horizontal. When the inclination of the operation face 30S is substantially horizontal, it means that the operation face 30S points up. In this case, it is easier for a user to perform a touch operation on the touch panel 302. That is, when a user is performing a touch operation on the touch panel 302, a contact body is less likely to be displaced. This results in small variation in the contact position. Therefore, the closer to horizontal the inclination of the operation face 30S, the further the panel control portion 31 makes the first allowable range smaller than the first reference range.

However, for some users, it is easier to operate the operation face 30S when it faces forward. Thus, the first reference range may be set as the first allowable range regardless of the inclination of the operation face 30S.

Depending on whether the inclination of the operation face 30S is large or small, even with the same user performing a touch operation, the contact size varies. Thus, also the second allowable range may be set based on the inclination of the operation face 30S. Or, the second reference range may be set as the second allowable range regardless of the inclination of the operation face 30S.

When the variation in the contact position falls outside the first allowable range, there is a probability that a signal indicating that a contact body is in contact with the touch panel 302 (that is, a contact position signal) is output from the touch screen 30 even though a user is not performing a touch operation on the touch panel 302 (there is a probability that the baseline is incorrect). Thus, in this case, the panel control portion 31 judges that the predetermined condition is met.

Also when the contact size falls outside the second allowable range, there is a probability that, even though a user is not performing a touch operation on the touch panel 302, a signal indicating that a contact body is in contact with the touch panel 302 is output from the touch screen 30. Thus, in this case, the panel control portion 31 judges that the predetermined condition is met. When the contact size detected by the panel control portion 31 is too large or too small as compared with the finger size of an ordinary user, it is judged that the predetermined condition is met.

Also when the contact pressure falls outside the third allowable range, there is a probability that, even though a user is not performing a touch operation on the touch panel 302, a signal indicating that a contact body is in contact with the touch panel 302 is output from the touch screen 30. Thus, in this case, the panel control portion 31 judges that the predetermined condition is met. When the contact pressure detected by the panel control portion 31 is too high or too low as compared with the pressing force by an ordinary user on the touch panel 302, it is judged that the predetermined condition is met.

It may be judged that the predetermined condition is met when two of the following conditions are met: a condition where the variation in the contact position detected by the panel control portion 31 falls outside the first allowable range, a condition where the contact size detected by the panel control portion 31 falls outside the second allowable range, and a condition where the contact pressure detected by the panel control portion 31 falls outside the third allowable range. Or, it may be judged that the predetermined condition is met when all of the three conditions are met.

The processing in step S2 may be omitted. That is, it may be judged that calibration of the touch panel 302 is necessary when at least one of the following conditions are met: a condition where the variation in the contact position detected by the panel control portion 31 falls outside the first allowable range, a condition where the contact size detected by the panel control portion 31 falls outside the second allowable range, and a condition where the contact pressure detected by the panel control portion 31 falls outside the third allowable range.

Or, based on the screen displayed on the touch screen 30, the first, second, and third allowable ranges may be set.

In this case, the panel control portion 31, when starting calibration judging processing, recognizes the size of the operation acceptance image (such as a software button) in the screen displayed on the touch screen 30. The panel control portion 31, based on the size of the operation acceptance image, sets the first, second, and third allowable ranges.

For example, when the size of the operation acceptance image is small, compared to when it is large, it is more difficult to perform a touch operation on the operation acceptance image. Thus, when a touch operation is performed on the acceptance screen, a user brings a contact body into contact with the display area of the operation acceptance image carefully (such that the contact position does not fall outside the display area of the operation acceptance image). When the size of the operation acceptance image is large, a user is more likely to bring the ball of his/her finger into contact with the display area of the operation acceptance image. On the other hand, when the size of the operation acceptance image is small, a user brings the tip of his/her finger into contact with the display area of the operation acceptance image.

As a result, when the size of the operation acceptance image is small, compared to when it is large, the variation in the contact position is smaller. Also, the contact size is smaller. Also, the contact pressure is lower.

Thus, when the first, second, and third allowable ranges are set based on the screen displayed on the touch screen 30, the smaller the size of the operation acceptance image on the displayed screen, the smaller the panel control portion 31 makes the first allowable range. Also, the smaller the size of the operation acceptance image on the displayed screen, the smaller the panel control portion 31 makes the median of the second allowable range. Also, the smaller the size of the operation acceptance image on the displayed screen, the smaller the panel control portion 31 makes the median of the third allowable range.

In the first embodiment, as described above, the configuration is such that the panel control portion 31 detects, in addition to the contact position, the contact size and the contact pressure. This makes it possible to make the panel control portion 31 perform calibration judging processing for judging whether calibration of the touch panel 302 is necessary (whether the baseline is incorrect). As a result, calibration of the touch panel 302 can be automatically performed when calibration of the touch panel 302 is necessary.

In this configuration, the contact position, the contact size, and the contact pressure are detected, and this makes it possible to accurately judge whether a user is touching the touch panel 302. Thus, it is possible to prevent calibration of the touch panel 302 from being performed when a user is touching the touch panel 302.

Also, in this configuration, when it is judged that calibration of the touch panel 302 is necessary, calibration of the touch panel 302 is performed automatically. Thus, it is not necessary to check whether the baseline is correct or not, and this is convenient for a user. Also, it is possible to prevent the incorrect baseline from being left uncorrected.

In the first embodiment, the panel control portion 31, when performing calibration judging processing, detects the variation of the contact position, the variation of the contact size, and the variation of the contact pressure. This makes it possible to accurately judge whether the electrostatic capacitance level is equal to or higher than the threshold value because a user is keeping a contact body in contact with the touch panel 302 or the electrostatic capacitance level is equal to or higher than the threshold value even though a user is not keeping a contact body in contact with the touch panel 302.

In the first embodiment, when, with no presence of a human detected based on the output value of the human sensor 6, at least one of the first, second, and third conditions is met, the panel control portion 31 judges that calibration of the touch panel 302 is necessary. This helps improve the accuracy of the result of judging whether calibration of the touch panel 302 is necessary.

In the first embodiment, when, with presence of a human detected based on the output value of the human sensor 6, when the time that has passed with no detection of contact with a contact body on the touch panel reaches a prescribed upper limit time, the panel control portion 31 judges that calibration of the touch panel 302 is necessary. Thus, when no touch operation by a user on the touch panel 302 is detected, it is judged that calibration of the touch panel 302 is necessary.

In the first embodiment, when, with contact with a contact body in an area outside the display area of the operation acceptance image (software button) on the touch panel 302 detected, when at least one of the first, second, and third conditions is met, the panel control portion 31 judges that calibration of the touch panel 302 is necessary. Thus, when a user is performing a touch operation on a software button, it is judged that no calibration of the touch panel 302 is necessary.

In the first configuration, the panel control portion 31 judges that the predetermined condition is met (calibration of the touch panel 302 is necessary) when at least one of the following conditions is met: a condition where the variation in the detected contact position falls outside the first allowable range; a condition where the detected contact size falls outside the second allowable range; and a condition where the detected contact pressure falls outside the third allowable range. That is, the panel control portion 31 judges that the predetermined condition is met when an abnormal value (a value that is far apart from the output value when a user performs a regular touch operation) is output from the touch screen 30.

Also, the panel control portion 31, based on at least one of the inclination of the operation face 30S of the touch screen 30 and the screen displayed on the touch screen 30, sets the first, second, and third allowable ranges. Thus, the first, second, and third allowable ranges can be set to be appropriate ranges respectively.

Second Embodiment

In a second embodiment, based on operation information (operation history) for each user, calibration judging processing is performed. This will now be described specifically.

The configuration of the second embodiment is basically similar to that of the first embodiment. Such elements as find their counterparts in the first embodiment are assigned the same reference signs and their description will be omitted.

The panel storage portion 32 stores operation information including contact position information, contact size information, and contact pressure information for each user. The contact position information is information indicating the variation in the contact position detected by the panel control portion 31 when the corresponding user is performing a touch operation on the touch panel 302 (when a user is keeping a contact body in contact with the touch panel 302). The contact size information is information indicating the contact size detected by the panel control portion 31 when the corresponding user is performing a touch operation on the touch panel 302. The contact pressure information is information indicating the contact pressure detected by the panel control portion 31 when the corresponding user is performing a touch operation on the touch panel 302.

A user who is performing a touch operation on the touch panel 302 is identified by the panel control portion 31. Here, when a user is performing a touch operation on the touch panel 302, the user performing the touch operation is captured by the camera 8. Thus, the panel control portion 31 recognizes the user captured by the camera 8 as the user performing a touch operation on the touch panel 302.

When identifying the user captured by the camera 8 (the user performing a touch operation on the touch panel 302), the panel control portion 31 refers to a face database. The face database is stored in the panel storage portion 32. In the face database, face information on each user is stored. The face information is information indicating features of the face of the corresponding user. The panel control portion 31 extracts the features from face image data included in the captured data obtained through capturing by the camera 8. Then, the panel control portion 31 recognizes, as the user performing the touch operation on the touch panel 302, the user corresponding to the face information of which the degree of similarity to the extracted features exceeds a predetermined degree of similarity.

Figure 4:
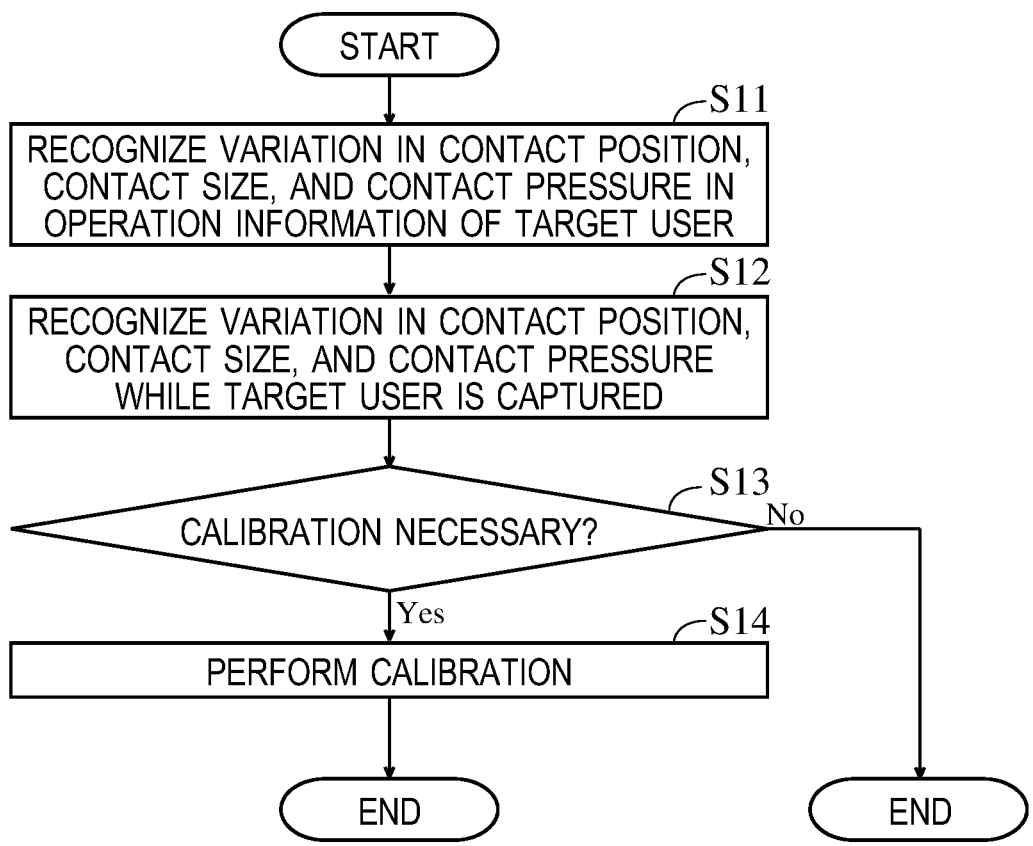
FIG. 4 is a flow chart showing the flow of calibration judging processing in a second embodiment.

The flow of calibration judging processing in the second embodiment will be described below with reference to a flow chart shown in FIG. 4. The panel control portion 31, on detecting that a user is captured by the camera 8, starts calibration judging processing. In the following description, the user captured by the camera 8 is referred to as the target user.

In step S11, the panel control portion 31 extracts the operation information of the target user. Then, the panel control portion 31 recognizes the variation in the contact position in the operation information of the target user, the contact size in the operation information of the corresponding user, and the contact pressure in the operation information of the target user.

In step S12, the panel control portion 31 detects the variation in the contact position, the contact size, and the contact pressure based on the output signals (contact position signal, contact size signal, and contact pressure signal) of the touch screen 30 when the target user is captured by the camera 8. In step S13, the panel control portion 31 judges whether calibration of the touch panel 302 is necessary based on the operation information (variation in the contact position, the contact size, and the contact pressure) of the target user, the variation in the detected contact position, the detected contact size, and the detected contact pressure.

For example, suppose that the variation in the contact position in the operation information of the target user is within the range of ±1 dot. In addition, suppose that the variation in the contact position detected by the panel control portion 31 remains outside a range larger than the range of ±1 dot (for example, the range of ±5 dots) throughout a predetermined time period. In this example, it can be due to the baseline being incorrect that, even though the actual variation is ±1 dot, the variation in the contact position detected by the panel control portion 31 is large. Thus, the panel control portion 31 judges that calibration is necessary.

Or, suppose that the variation in the contact position in the operation information of the target user is within the range of ±5 dots. In addition, suppose that the variation in the contact position detected by the panel control portion 31 remains within a range smaller than the range of ±5 dots (for example, the range of ±1 dot) throughout the predetermined time period. In this example, it can be due to the baseline being incorrect that, even though the actual variation is ±5 dots, the variation in the contact position detected by the panel control portion 31 is small. Thus, the panel control portion 31 judges that calibration is necessary.

Or, suppose that the dimension of the contact size in either of the X-axis and Y-axis directions in the operation information of a target user is 10 mm. In addition, suppose that the one dimension of the contact size detected by the panel control portion 31 remains, throughout the predetermined time period, larger (for example, 20 mm) than the value calculated by adding a predetermined margin to the one dimension in the operation information of the target user. In this example, it can be due to the baseline being incorrect that, even though the actual contact size is smaller than the value calculated by adding the predetermined margin to 10 mm, the contact size detected by the panel control portion 31 is large. Thus, the panel control portion 31 judges that calibration is necessary.

Or, suppose that the dimension of the contact size in either of the X-axis and Y-axis directions in the operation information of a target user is 10 mm. In addition, suppose that the one dimension of the contact size detected by the panel control portion 31 remains, throughout the predetermined time period, smaller (for example, 3 mm) than the value calculated by subtracting a predetermined margin from the one dimension in the operation information of the target user. In this example, it can be due to the baseline being incorrect that, even though the actual contact size is larger than the value calculated by subtracting the predetermined margin from 10 mm, the contact size detected by the panel control portion 31 is small. Thus, the panel control portion 31 judges that calibration is necessary.

Or, for yet another example, suppose that the contact pressure detected by the panel control portion 31 remains, throughout the predetermined time period, higher than the contact pressure in the operation information of the target user (for example, twice as high as the contact pressure in the operation information of the target user). For still another example, suppose that the contact pressure detected by the panel control portion 31 remains, throughout a predetermined time period, lower than the contact pressure in the operation information of the target user (for example, 0.5 times as high as the contact pressure in the operation information of the target user).

Here, when, for example, a user feels that the sensitivity of the touch panel 302 is low, he/she acts to make the pressure against the touch panel 302 with the contact body higher or lower than usual. In this case, the contact pressure detected by the panel control portion 31 becomes higher or lower than usual. Thus, when the contact pressure detected by the panel control portion 31 remains, throughout the predetermined time period, higher or lower than the contact pressure in the operation information of the target user, it can be presumed that the baseline may be incorrect. Thus, in this case, the panel control portion 31 judges that calibration is necessary.

In step S13, when the panel control portion 31 judges that calibration of the touch panel 302 is necessary, the process proceeds to step S14. When the panel control portion 31 judges that no calibration of the touch panel 302 is necessary, this flow is finished.

In step S14, the panel control portion 31 automatically performs calibration of the touch panel 302. For example, on detecting, based on captured data obtained through capturing by the camera 8, that the target user is away from the image forming apparatus 100 (that no target user is captured in captured data), the panel control portion 31 performs calibration of the touch panel 302. Or, on detecting that no human is around the image forming apparatus 100 based on the output value of the human sensor 6, the panel control portion 31 performs calibration of the touch panel 302.

In the second embodiment, with the configuration as described above, as in the first embodiment, calibration of the touch panel 302 can be performed automatically when calibration of the touch panel 302 is necessary.

In the second configuration, when a user is captured by the camera 8 (when there is a high probability that a user is performing a touch operation on the touch panel 302), the panel control portion 31 detects the variation of the contact position, the contact size, and the contact pressure. The panel control portion 31 judges whether calibration of the touch panel 302 is necessary based on the operation information of the target user captured by the camera 8, the variation in the detected contact position, the detected contact size, and the detected contact pressure. With this configuration, it is possible to compare information (operation information) on the touch operation performed by the target user in the past and the signals (contact position signal, contact size signal, and contact pressure signal) currently output from the touch screen 30, and thus it is possible to accurately judge whether calibration of the touch panel 302 is necessary.

The embodiments disclosed herein should be understood to be in every aspect illustrative and not restrictive. The scope of the present disclosure is not limited by the description of the embodiments given above but by the appended claims, and encompasses any modifications made within a sense and scope equivalent to those of the claims.

What is claimed is:

1. A display input device comprising:
   a touch screen including a touch panel for accepting a touch operation;
   a human sensor; and
   a control portion;
   wherein
   the control portion detects a contact position on the touch panel with a contact body, a contact size on the touch panel with the contact body, and a contact pressure on the touch panel with the contact body,
   the control portion judges whether calibration of the touch panel is necessary based on the contact position, the contact size, and the contact pressure,
   the control portion performs the calibration when it is judged that the calibration is necessary;
   the control portion judges that the calibration is necessary when one or a plurality of conditions are met, the conditions including:
   a first condition where variation in the detected contact position is within a prescribed first variation range throughout a predetermined time period,
   a second condition where variation in the detected contact size is within a prescribed second variation range throughout the predetermined time period, and
   a third condition where variation in the detected contact pressure is within a prescribed third variation range throughout the predetermined time period,
   when, with no presence of a human detected based on an output value of the human sensor, one or a plurality of the first, second, and third conditions are met, the control portion judges that the calibration is necessary, and
   when, with presence of a human detected based on the output value of the human sensor, a time that has passed with no detection of contact with the contact body on the touch panel reaches a prescribed upper limit time, the control portion judges that the calibration of the touch panel is necessary.

2. The display input device according to claim 1, wherein
   the touch screen displays an operation acceptance image for accepting the touch operation, and
   when, with contact with the contact body in an area outside the display area of the operation acceptance image on the touch panel detected, one or a plurality of the first, second, and third conditions are met, the control portion judges that the calibration is necessary.

3. An image forming apparatus comprising the display input device according to claim 1.

4. A display input device comprising:
a touch screen including a touch panel for accepting a touch operation; and
a control portion,
wherein
the control portion detects a contact position on the touch panel with a contact body, a contact size on the touch panel with the contact body, and a contact pressure on the touch panel with the contact body,
the control portion judges whether calibration of the touch panel is necessary based on the contact position, the contact size, and the contact pressure,
the control portion performs the calibration when it is judged that the calibration is necessary,
the control portion judges that the calibration is necessary when one or a plurality of conditions are met, the conditions including
a condition where variation in the detected contact position falls outside a first allowable range,
a condition where the detected contact size falls outside a second allowable range, and
a condition where the detected contact pressure falls outside a third allowable range,
the control portion detects an inclination angle, with respect to the horizontal direction, of an operation face of the touch panel for accepting the touch operation,
when judging whether the calibration is necessary, the control portion sets the first, second, and third allowable ranges based on the inclination of the operation face with respect to the horizontal direction, and
the closer to horizontal the inclination of the operation face, the higher the control portion makes a median of the third allowable range.

5. The display input device according to claim 4, wherein
the control portion sets the first, second, and third allowable ranges based on a screen displayed on the touch screen.

6. An image forming apparatus comprising the display input device according to claim 4.

7. A display input device comprising:
a touch screen including a touch panel for accepting a touch operation;
a storage portion;
a camera; and
a control portion;
wherein
the control portion detects a contact position on the touch panel with a contact body, a contact size on the touch panel with the contact body, and a contact pressure on the touch panel with the contact body,
the control portion judges whether calibration of the touch panel is necessary based on the contact position, the contact size, and the contact pressure,
the control portion performs the calibration when it is judged that the calibration is necessary,
the storage portion stores, for each user, operation information including:
information on variation in the contact position detected by the control portion when the user is performing the touch operation on the touch panel,
information on the contact size detected by the control portion when the user is performing the touch operation on the touch panel,
information on the contact pressure detected by the control portion when the user is performing the touch operation on the touch panel; and
the camera captures the user performing the touch operation on the touch panel,
the control portion
detects the variation in the contact position, the contact size, and the contact pressure when the user is being captured by the camera, and
judges whether the calibration is necessary based on the operation information of the user being captured by the camera, the detected variation in the contact position, the detected contact size, and the detected contact pressure.

8. An image forming apparatus comprising the display input device according to claim 7.

* * * * *